United States Patent
Kitabatake

[11] Patent Number: 5,892,465
[45] Date of Patent: Apr. 6, 1999

[54] DECODING APPARATUS AND DECODING METHOD

[75] Inventor: Osamu Kitabatake, Kanagawa, Japan

[73] Assignee: NEC Corporation, Tokyo, Japan

[21] Appl. No.: 880,457

[22] Filed: Jun. 24, 1997

[30] Foreign Application Priority Data

Jun. 27, 1996 [JP] Japan .................................. 8-167901

[51] Int. Cl.[6] .................................................. H03M 7/00
[52] U.S. Cl. .................................................. 341/50; 341/63
[58] Field of Search ........................................ 341/50, 63

[56] References Cited

U.S. PATENT DOCUMENTS

| | | | |
|---|---|---|---|
| 4,051,530 | 9/1977 | Kuroda et al. | 348/419 |
| 5,148,431 | 9/1992 | Hayashi | 371/5.1 |

FOREIGN PATENT DOCUMENTS

| | | |
|---|---|---|
| 0 771 083 | 5/1997 | European Pat. Off. . |
| 2-058440 | 2/1990 | Japan . |
| WO 95/15655 | 6/1995 | WIPO . |

*Primary Examiner*—Howard L. Williams
*Attorney, Agent, or Firm*—Foley & Lardner

[57] ABSTRACT

A decoding apparatus includes a quantized bit count storage, a sound-image data decomposer, a unit frame length calculator, a quantized bit count adder, a quantized bit total value storage, a comparator, and a decoding processor. The comparator compares the value of the unit frame length of an input compressed bit stream with the quantized bit total value of the compressed bit stream, and outputs an error occurrence signal if the quantized bit total value exceeds the value of the unit frame length. If the comparator outputs the error occurrence signal to the decoding processor, the decoding processor performs interpolation processing for a sound-image signal and thereby prevents production of noise which is produced when the quantized bit total value exceeds the value of the unit frame length.

4 Claims, 4 Drawing Sheets

DECODING APPARATUS AND DECODING METHOD

BACKGROUND OF THE INVENTION

1. Field of the Invention

The present invention relates to a decoding apparatus and a decoding method and, more particularly, to a decoding apparatus and a decoding method of decoding a bit stream of a transmission-storage system of a high-efficiency compressed signal of, e.g., sounds and images.

2. Description of the Prior Art

One conventional example of a decoding apparatus used in high-efficiency coding systems of this sort is shown in a block diagram of FIG. 1. As shown in FIG. 1, this conventional apparatus comprises a sound-image data decomposer 13, a quantized bit count storage 14, a unit frame length calculator 15, and a decoding processor 16. As shown in FIG. 2, the decoding processor 16 includes an arithmetic unit 19. FIG. 3 shows the general structure of a unit frame which forms a compressed bit stream 101 to be decoded. This unit frame follows sound-image data 204 of an immediately preceding unit frame, consists of a synchronous pattern 201 at the head of the frame, frame information 202, a quantized bit count 203, and sound-image data 204, and is followed by a synchronous pattern 201 of the next unit frame. This conventional apparatus will be described below with reference to FIGS. 1 to 3.

Referring to FIG. 1, the compressed bit stream 101 formed by a high-efficiency compressed signal of, e.g., sounds and images is input from an input terminal 17 to the sound-image data decomposer 13, the quantized bit count storage 14, and the unit frame length calculator 15. Upon receiving the compressed bit stream 101, the quantized bit count storage 14 extracts and stores the quantized bit count 203 (see FIG. 3) of the sound data and the image data contained in the unit frame of this compressed bit stream 101. The sound-image data decomposer 13 receives quantized bit count information 102 output from the quantized bit count storage 14 and decomposes the sound data and the image data contained in the input compressed bit stream 101 from the input terminal 17 by referring to the quantized bit count 203 contained in the quantized bit count information 102. The sound-image data decomposer 13 outputs sound-image data 103 as an object of decoding arithmetic processing to the decoding processor 16. In the decoding processor 16, the arithmetic unit 19 shown in FIG. 2 performs decoding arithmetic processing for the sound-image data 103 and outputs a desired sound-image signal 109 from an output terminal 18 to an external device. Meanwhile, when receiving the input compressed bit stream 101 from the input terminal 17, the unit frame length calculator 15 calculates a unit frame length unique to a compression system by referring to the frame information 202 (see FIG. 3) contained in the compressed bit stream 101. The unit frame length calculator 15 outputs unit frame length information 106 to an external synchronous detector.

Accordingly, the decoding method in the above decoding apparatus comprises, as a main procedure, the steps of extracting and holding the quantized bit count of the input bit stream 101, decomposing the sound data and the image data contained in the bit stream 101 by referring to the quantized bit count, and decoding the decomposed sound data and image data to output a desired sound-image signal.

In the conventional decoding apparatus and its decoding method described above, the length of a total value of the quantized bit counts of sound-image data of a normally compressed bit stream is naturally shorter than one frame length. However, if the total value of the quantized bit counts becomes larger than one frame length due to, e.g., an erroneous operation or a low quality of an encoder, unrecoverable noise is produced in decoding processing. This makes it impossible to normally decode the sound-image data of this compressed bit stream.

SUMMARY OF THE INVENTION

The present invention has been made in consideration of the above problem of the prior art, and has as its object to provide a decoding apparatus and a decoding method capable of performing normal decoding processing by preventing production of noise when a total value of quantized bit counts becomes larger than one frame length.

To achieve the above object, according to a first basic aspect of the present invention, there is provided a decoding apparatus comprising quantized bit count storage means for receiving a compressed bit stream and extracting and holding a quantized bit count of the compressed bit stream, sound-image data decomposing means for receiving the compressed bit stream, decomposing sound-image data contained in the compressed bit stream by referring to quantized bit count information output from the quantized bit count storage means, and extracting and outputting sound-image data to be decoded, unit frame length calculating means for receiving the compressed bit stream and calculating and outputting a unit frame length unique to a compression system by referring to frame information contained in the compressed bit stream, quantized bit count adding means for cumulatively adding the quantized bit counts contained in the output quantized bit count information from the quantized bit count storage means, quantized bit total value storage means for sequentially receiving and storing quantized bit count sums from the quantized bit count adding means and feeding the input quantized bit count sums back to the quantized bit count adding means for cumulative addition, comparing means for comparing a value of the output unit frame length from the unit frame length calculating means with an output quantized bit total value from the quantized bit total value storage means, and outputting an error occurrence signal if the quantized bit total value exceeds the value of the unit frame length, and decoding processing means for receiving the sound-image data to be decoded, which is output from the sound-image data decomposing means, performing decoding arithmetic processing for the input sound-image data, and outputting a desired sound-image signal, wherein if the comparing means outputs the error occurrence signal to the decoding processing means, the decoding processing means performs interpolation processing for the sound-image signal and thereby prevents production of noise which is produced when the quantized bit total value exceeds the value of the unit frame length.

The decoding processing means in the first basic aspect may comprise an arithmetic unit for receiving the sound-image data to be decoded, which is output from the sound-image data decomposing means, and performing the decoding arithmetic processing for the input sound-image data, a preceding frame sound-image storage for receiving and temporarily storing the sound-image signal output from the arithmetic unit, and a selector for receiving the sound-image signal output from the arithmetic unit and the immediately preceding sound-image signal stored in the preceding frame sound-image storage, selectively outputting the output sound-image signal from the arithmetic unit if the error occurrence signal is not input, and selectively outputting the sound-image signal of an immediately preceding frame stored in the preceding frame sound-image storage if the error occurrence signal is input.

To achieve the above object, according to a second basic aspect of the present invention, there is provided a decoding method comprising the first step of extracting and holding a quantized bit count of a compressed bit stream, the second step of calculating a unit frame length of the compressed bit stream by referring to frame information contained in the compressed bit stream, the third step of decomposing sound-image data of the compressed bit stream by referring to the quantized bit count obtained in the first step, and outputting sound-image data to be decoded, the fourth step of sequentially adding the quantized bit counts obtained in the first step and holding a total value of the quantized bit counts, the fifth step of comparing the unit frame length calculated in the second step with the total value of the quantized bit counts held in the fourth step, and generating a predetermined error occurrence signal if the total value of the quantized bit counts is larger than the unit frame length, the sixth step of performing, if the error occurrence signal is not generated in the fifth step, decoding arithmetic processing for the sound-image data to be decoded which is obtained in the third step, outputting a desired sound-image signal, and temporarily holding the desired sound-image signal, and the seventh step of performing, if the error occurrence signal is generated in the fifth step, frame interpolation processing by selecting the sound-image signal of an immediately preceding frame temporarily stored in the sixth step and outputting the selected signal as a desired sound-image signal.

The present invention having the above aspects includes means for checking, when decoding processing is performed for a compressed bit stream, whether a total value of quantized bit counts previously calculated and set is larger than the frame length of a unit frame in the compressed bit stream. If the total value of the quantized bit counts is larger than the frame length of the unit frame, frame interpolation processing or silencing processing is performed. This effectively prevents production of noise and allows normal decoding processing to be performed.

The above and many other objects, features and advantages of the present invention will become manifest to those skilled in the art upon making reference to the following detailed description and accompanying drawings in which preferred embodiments incorporating the principles of the present invention are shown by way of illustrative example.

DETAILED DESCRIPTION OF THE PREFERRED EMBODIMENT

One preferred embodiment of the present invention will be described below with reference to the accompanying drawings.

Figure 1:
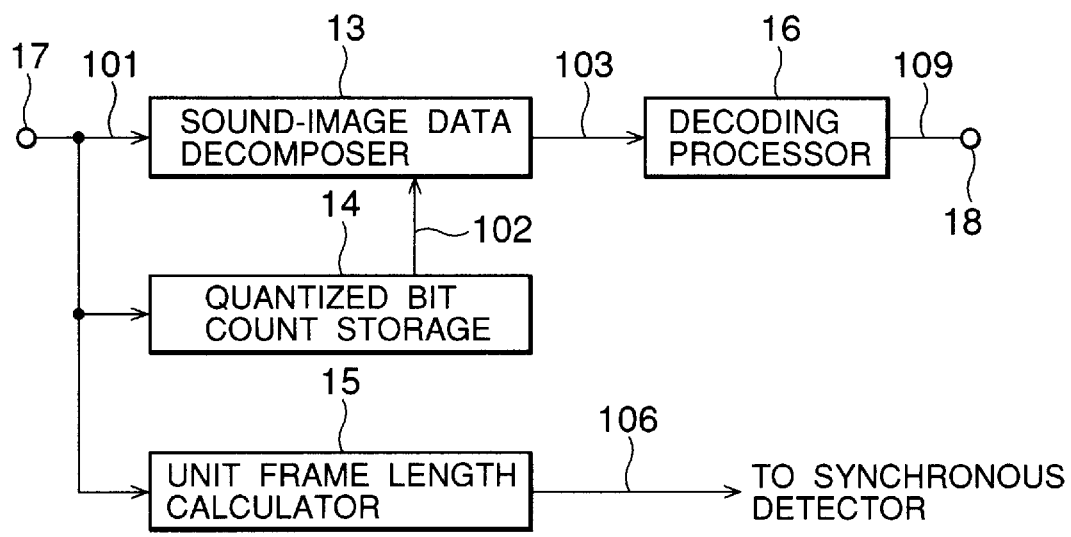
FIG. 1 is a block diagram showing an entire configuration of a decoding apparatus used in a conventional high-efficiency coding system.
Figure 2:
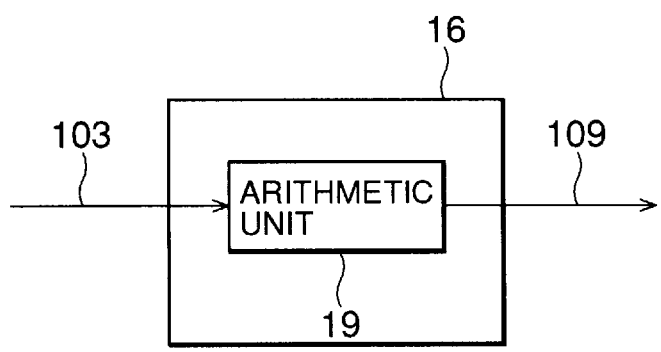
FIG. 2 is a block diagram showing an inner arrangement of a decoding processor in the conventional apparatus shown in FIG. 1.
Figure 3:
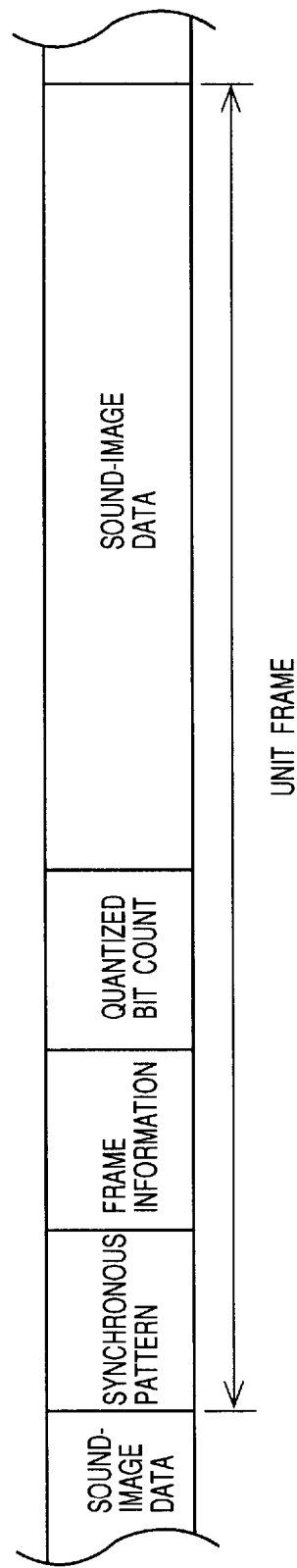
FIG. 3 is a view showing the structure of a unit frame of a conventional general compressed bit stream of, e.g., sounds and images.
Figure 4:
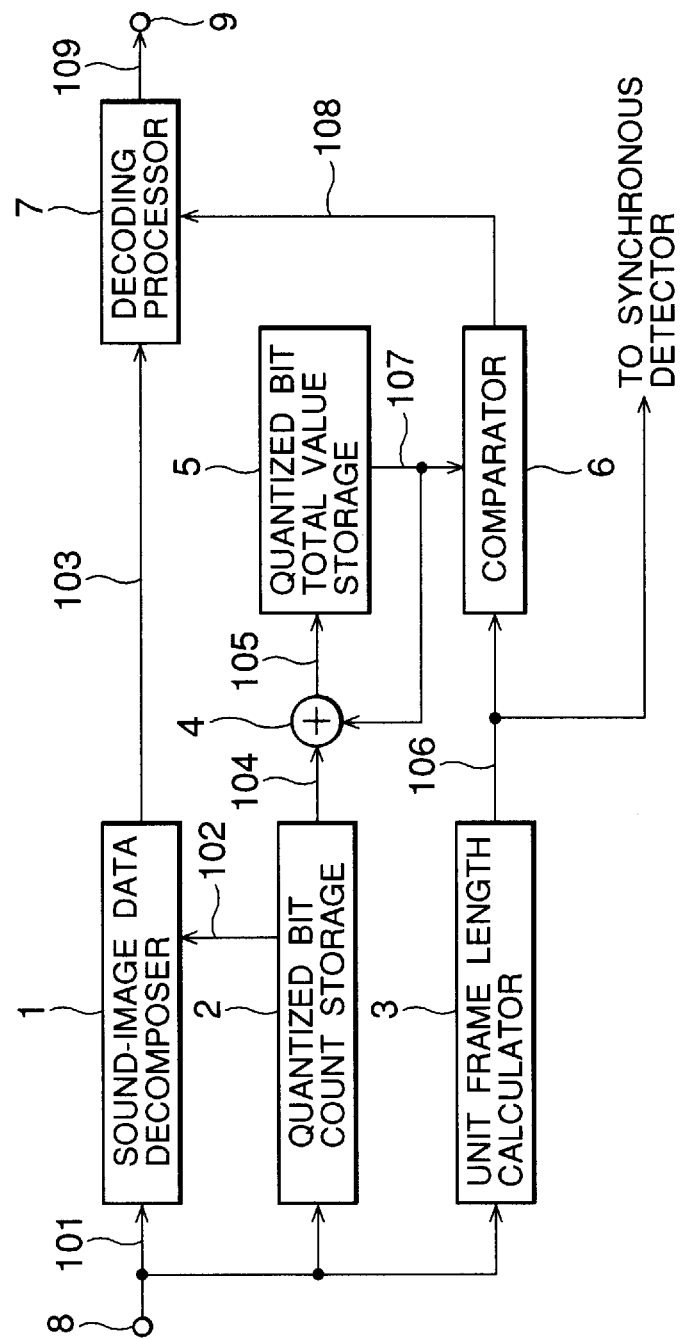
FIG. 4 is a block diagram showing the entire configuration of a decoding apparatus used in a high-efficiency coding system according to an embodiment of the present invention.
Figure 5:
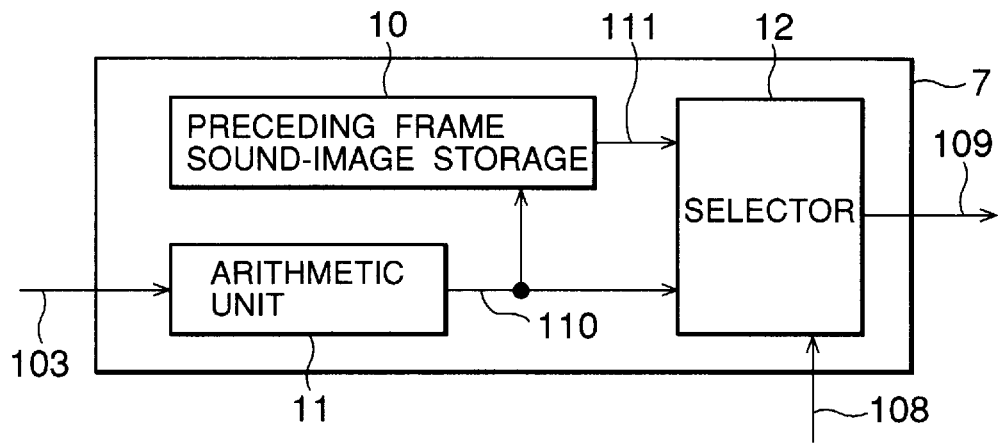
FIG. 5 is a block diagram showing the inner arrangement of a decoding processor used in the embodiment of the present invention.

FIG. 4 is a block diagram showing an embodiment of the first invention of the present invention. As shown in FIG. 4, this embodiment comprises a sound-image data decomposer 1, a quantized bit count storage 2, a unit frame length calculator 3, an adder 4, a quantized bit total value storage 5, a comparator 6, and a decoding processor 7. As shown in FIG. 5, the decoding processor 7 includes a preceding frame sound-image storage 10, an arithmetic unit 11, and a selector 12. FIG. 3 is a view, which is also cited in "DESCRIPTION OF THE PRIOR ART", showing a general structure of a unit frame which forms a bit stream to be decoded. As described previously, this unit frame follows sound-image data 204 of an immediately preceding unit frame, consists of a synchronous pattern 201 at the head of the frame, frame information 202, a quantized bit count 203, and sound-image data 204, and is followed by a synchronous pattern 201 of the next unit frame. FIGS. 6A, 6B, 6C, 6D, and 6E are charts showing the operation timings of individual elements in the embodiment of the present invention, and indicate a compressed bit stream 101, a frame length 205, a quantized bit count 203, a quantized bit total value 206, and an error occurrence signal 108, respectively.

The operation of the embodiment of the present invention will be described first with reference to FIGS. 3 to 5.

Referring to FIG. 4, the compressed bit stream 101 formed by a high-efficiency compressed signal of, e.g., sounds and images is input from an input terminal 8 to the sound-image data decomposer 1, the quantized bit count storage 2, and the unit frame length calculator 3. Upon receiving the compressed bit stream 101, the quantized bit count storage 2 constituted by flip-flops extracts and stores the quantized bit count 203 of the sound data and the image data contained in the unit frame of this compressed bit stream 101. The sound-image data decomposer 1 receives quantized bit count information 102 output from the quantized bit count storage 2 and decomposes the sound data and the image data contained in the input compressed bit stream 101 from the input terminal 8 by referring to the quantized bit count 203 contained in the quantized bit count information 102. The sound-image data decomposer 1 outputs predetermined sound-image data 103 to the decoding processor 7. Output quantized bit count information 104 containing the quantized bit count 203 from the quantized bit count storage 2 is input to the adder 4. The adder 4 adds the quantized bit count 203 contained in the quantized bit count information 104 and the quantized bit total value 206 contained in quantized bit total value information 107 output from the quantized bit total value storage 5. The adder 4 outputs added bit value information 105 to the quantized bit total value storage 5 which stores this added bit value information 105 as a new quantized bit total value 206.

Meanwhile, when receiving the input compressed bit stream 101 from the input terminal 8, the unit frame length calculator 3 calculates a unit frame length unique to a compression system by referring to the frame information 202 contained in the compressed bit stream 101. The unit frame length calculator 3 outputs unit frame length information 106 containing the frame length 205 of this unit frame to the comparator 6 and an external synchronous detector. The comparator 6 sequentially compares the frame length 205 contained in the unit frame length information 106 with the quantized bit total value 206 contained in the output quantized bit total value information 107 from the quantized bit total value storage 5. If the quantized bit total value 206 is larger than the frame length 205, the comparator 6 outputs an error occurrence signal 108 corresponding to the frame to the decoding processor 7.

In the decoding processor 7, the sound-image data 103 which is output from the sound-image data decomposer 1 in FIG. 4 is input to the arithmetic unit 11. The arithmetic unit 11 performs decoding arithmetic processing for the sound-image data 103 and outputs a desired sound-image signal 110 to the preceding frame sound-image storage 10 and the selector 12. The preceding frame sound-image storage 10 temporarily stores the input sound-image signal 110. If the error occurrence signal 108 is not input, the selector 12 selects the input sound-image signal 110 from the arithmetic unit 11 and outputs the signal 110 as a desired sound-image signal 109 from an output terminal 9 to an external device. If the error occurrence signal 108 is input from the comparator 6, data interpolation processing is performed. That is, when receiving the error occurrence signal 108, the selector 12 selects a sound-image signal 111 corresponding to an immediately preceding frame, which is output from the preceding frame sound-image storage 10, and outputs the signal 111 as the desired sound-image signal 109 to an external device. More specifically, if the quantized bit total value 206 is found to be larger than the frame length 205 by the comparator 6, the decoding processor 7 receives the output error occurrence signal 108 and performs frame interpolation processing for the sound-image signal 109 to be decoded. Note that when receiving the error occurrence signal 108, the decoding processor 7 can also silence the sound-image signal 109 to be output, instead of performing the frame interpolation processing.

Figure 6:
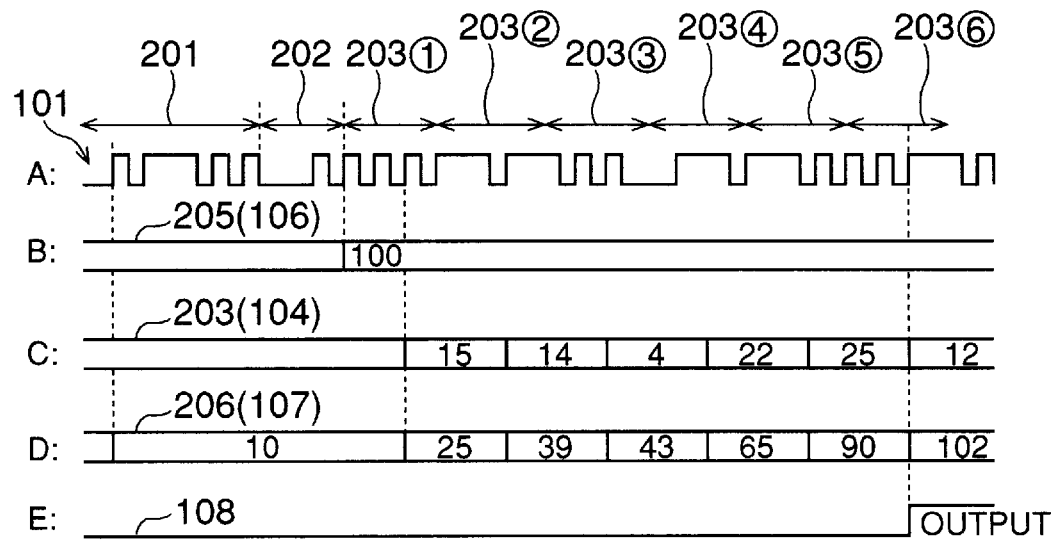
FIGS. 6A to 6E are timing charts showing a decoding scheme in the high-efficiency coding system of the present invention.

The decoding method of the present invention will be described below with reference to the unit frame structure shown in FIG. 3 and the timing charts of the decoding scheme shown in FIGS. 6A to 6E. First, the frame length 205 (FIG. 6B) is calculated from the frame information 202 (FIG. 3) in the frame of the compressed bit stream 101. Referring to FIG. 6B, the unit frame length 205 is set to "100" as an example. As the quantized bit total value 206 (FIG. 6D), the total number of bits constituting the unit frame except for the sound-image data is previously set at the head of the unit frame. In FIG. 6D, the quantized bit total value 206 is set to "10" as an example. Subsequently, the content "15" of a quantized bit count 203 ① (FIG. 6A) is added to "10" as the quantized bit total value 206, and "25" is newly obtained as the addition result. This value "25" is set as the quantized bit total value 206. Analogously, the contents of the quantized bit count 203 are sequentially added in the order of the content "14" of a quantized bit count 203 ②, the content "4" of a quantized bit count 203 ③, the content "22" of a quantized bit count 203 ④, the content "25" of a quantized bit count 203 ⑥ and the content "12" of a quantized bit count 203 ⑥ (FIG. 6C). In the example shown in FIG. 6C, when the quantized bit count 203 ⑤ is added, the quantized bit total value 206 (FIG. 6D) becomes "102" which exceeds the value "100" of the frame length 205 (FIG. 6B). Consequently, it is determined that the corresponding frame has an error, and the error occurrence signal 108 (FIG. 6E) is output.

That is, in an event in which the quantized bit total value 206 is larger than the frame length 205, the decoding processor 7 performs frame interpolation processing for the sound-image signal 109 to be decoded. Consequently, the sound-image data of the compressed bit stream is normally decoded, and production of noise is prevented.

What I claimed is:

1. A decoding apparatus comprising:

quantized bit count storage means for receiving a compressed bit stream and extracting and holding a quantized bit count of the compressed bit stream;

sound-image data decomposing means for receiving the compressed bit stream, decomposing sound-image data contained in the compressed bit stream by referring to quantized bit count information output from said quantized bit count storage means, and extracting and outputting sound-image data to be decoded;

unit frame length calculating means for receiving the compressed bit stream and calculating and outputting a unit frame length unique to a compression system by referring to frame information contained in the compressed bit stream;

quantized bit count adding means for cumulatively adding the quantized bit counts contained in the output quantized bit count information from said quantized bit count storage means;

quantized bit total value storage means for sequentially receiving and storing quantized bit count sums from said quantized bit count adding means and feeding the input quantized bit count sums back to said quantized bit count adding means for cumulative addition;

comparing means for comparing a value of the output unit frame length from said unit frame length calculating means with an output quantized bit total value from said quantized bit total value storage means, and outputting an error occurrence signal if the quantized bit total value exceeds the value of the unit frame length; and decoding processing means for receiving the sound-image data to be decoded, which is output from said sound-image data decomposing means, performing decoding arithmetic processing for the input sound-image data, and outputting a desired sound-image signal, wherein if said comparing means outputs the error occurrence signal to said decoding processing means, said decoding processing means performs interpolation processing for the sound-image signal and thereby prevents production of noise which is produced when the quantized bit total value exceeds the value of the unit frame length.

2. An apparatus according to claim 1, wherein said decoding processing means comprises:

an arithmetic unit for receiving the sound-image data to be decoded, which is output from said sound-image data decomposing means, and performing the decoding arithmetic processing for the input sound-image data;

a preceding frame sound-image storage for receiving and temporarily storing the sound-image signal output from said arithmetic unit; and a selector for receiving the sound-image signal output from said arithmetic unit and the immediately preceding sound-image signal stored in said preceding frame sound-image storage, selectively outputting the output sound-image signal from said arithmetic unit if the error occurrence signal is not input, and selectively outputting the sound-image signal of an immediately preceding frame stored in said preceding frame sound-image storage if the error occurrence signal is input.

3. A decoding method comprising:

the first step of extracting and holding a quantized bit count of a compressed bit stream;

the second step of calculating a unit frame length of the compressed bit stream by referring to frame information contained in the compressed bit stream;

the third step of decomposing sound-image data of the compressed bit stream by referring to the quantized bit count obtained in the first step, and outputting sound-image data to be decoded;

the fourth step of sequentially adding the quantized bit counts obtained in the first step and holding a total value of the quantized bit counts;

the fifth step of comparing the unit frame length calculated in the second step with the total value of the quantized bit counts held in the fourth step, and generating a predetermined error occurrence signal if the total value of the quantized bit counts is larger than the unit frame length;

the sixth step of performing, if the error occurrence signal is not generated in the fifth step, decoding arithmetic processing for the sound-image data to be decoded which is obtained in the third step, outputting a desired sound-image signal, and temporarily holding the desired sound-image signal; and the seventh step of performing, if the error occurrence signal is generated in the fifth step, frame interpolation processing by selecting the sound-image signal of an immediately preceding frame temporarily stored in the sixth step and outputting the selected signal as a desired sound-image signal.

4. A method according to claim 3, wherein if the error occurrence signal is generated, a decoding processor silences the sound-image signal to be output, instead of performing the frame interpolation processing.

* * * * *